United States Patent
Boehm et al.

(10) Patent No.: US 11,312,345 B2
(45) Date of Patent: Apr. 26, 2022

(54) SYSTEMS AND METHODS FOR DETECTING AND CONTROLLING A FLUID CONSUMPTION DETECTION WARNING

(71) Applicant: Honda Motor Co., Ltd., Tokyo (JP)

(72) Inventors: Kevin K. Boehm, Marysville, OH (US); David J. Bartlett, Marysville, OH (US); Lorne R. Dyar, Plain City, OH (US); Fumiaki Honjo, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 194 days.

(21) Appl. No.: 16/747,981

(22) Filed: Jan. 21, 2020

(65) Prior Publication Data

US 2021/0221346 A1 Jul. 22, 2021

(51) Int. Cl.
| | |
|---|---|
| *B60T 8/32* | (2006.01) |
| *B60T 17/00* | (2006.01) |
| *B60T 17/22* | (2006.01) |
| *B60T 13/00* | (2006.01) |
| *B60T 8/58* | (2006.01) |
| *B60T 8/40* | (2006.01) |
| *F15B 9/03* | (2006.01) |

(52) U.S. Cl.
CPC .............. *B60T 8/58* (2013.01); *B60T 8/4072* (2013.01); *F15B 9/03* (2013.01); *F15B 2211/715* (2013.01)

(58) Field of Classification Search
None
See application file for complete search history.

(56) References Cited

U.S. PATENT DOCUMENTS

| | | |
|---|---|---|
| 6,366,207 B1 | 4/2002 | Murphy |
| 7,391,305 B2 | 6/2008 | Knoll et al. |
| 7,391,309 B2 | 6/2008 | Chartier et al. |
| 8,738,228 B2 | 5/2014 | Filev et al. |
| 9,020,691 B2 | 4/2015 | Svensson et al. |
| 9,045,145 B2 | 6/2015 | Filev et al. |

(Continued)

FOREIGN PATENT DOCUMENTS

EP    2505446 B1    12/2013

OTHER PUBLICATIONS

Filev et al. "Real-time Driving Behavior Identification Based on Driver-in-the-loop Vehicle Dynamics and Control." IEEE International Conference on Systems, Man, and Cybernetics 2009, pp. 2089-2094.

*Primary Examiner* — Adam D Tissot
(74) *Attorney, Agent, or Firm* — Armstrong Teasdale LLP

(57) ABSTRACT

Systems and methods for providing vehicle condition indicators are provided. The method for controlling the vehicle includes receiving sensor information from a plurality of sensors associated with the vehicle. The sensor information includes throttle values and lateral acceleration values. The method also includes analyzing the throttle values for a plurality of points in time to determine whether to activate an aggressive throttle flag. The method further includes analyzing the lateral acceleration values for the plurality of points in time to determine whether to activate an aggressive lateral acceleration flag. In addition, the method includes activating a fluid consumption detection enable flag when the aggressive throttle flag and the aggressive lateral acceleration flag are both active.

20 Claims, 3 Drawing Sheets

(56) References Cited

U.S. PATENT DOCUMENTS

| | | |
|---|---|---|
| 9,129,460 B2 | 9/2015 | McClellan et al. |
| 9,153,116 B2 | 10/2015 | Kline |
| 10,279,793 B2 | 5/2019 | Li et al. |
| 2005/0090963 A1 | 4/2005 | Kuhn et al. |
| 2005/0131597 A1* | 6/2005 | Raz .................. G07C 5/085 701/29.1 |
| 2011/0270500 A1* | 11/2011 | Ummer ............... B60T 8/4045 701/70 |
| 2013/0052614 A1 | 2/2013 | Mollicone et al. |
| 2013/0135092 A1 | 5/2013 | Wu et al. |
| 2020/0062233 A1* | 2/2020 | Yu ..................... B60T 17/221 |

* cited by examiner

SYSTEMS AND METHODS FOR DETECTING AND CONTROLLING A FLUID CONSUMPTION DETECTION WARNING

BACKGROUND

The present disclosure relates generally to vehicle control systems and, more specifically, to vehicle control systems for monitoring operation of vehicle brake system and providing vehicle condition status alerts.

At least some known Electric Servo Brake (ESB) systems can detect brake fluid consumption changes by comparing a master cylinder stroke versus master cylinder pressure to a stored model. If the required master cylinder stroke to reach a predefined master cylinder pressure becomes too high (i.e., exceeds a predefined threshold), braking performance may be reduced. Some known vehicles display an indicator to inform the driver of this condition. This may be referred to as a Fluid Consumption Detection (FCD) warning. However, when a driver operates the vehicle in certain aggressive manners, the detection logic is less reliable and may produce false warnings to the driver. Accordingly, a need exists for a control system and method to prevent false warnings to the driver.

BRIEF SUMMARY

In one aspect, a system for providing vehicle condition indicators is provided. The system includes a controller including at least one processor in communication with at least one memory. The at least one processor is programmed to receive sensor information from a plurality of sensors associated with a vehicle. The sensor information includes throttle values and lateral acceleration values. The at least one processor is also programmed to analyze the throttle values for a plurality of points in time to determine whether to activate an aggressive throttle flag. The at least one processor is further programmed to analyze the lateral acceleration values for the plurality of points in time to determine whether to activate an aggressive lateral acceleration flag. In addition, the at least one processor is programmed to activate a fluid consumption detection enable flag when the aggressive throttle flag and the aggressive lateral acceleration flag are both active.

In another aspect, a method for providing vehicle condition indicators is provided. The method is implemented by a vehicle controller including at least one processor in communication with at least one memory. The method includes receiving sensor information from a plurality of sensors associated with a vehicle. The sensor information includes throttle values and lateral acceleration values. The method also includes analyzing the throttle values for a plurality of points in time to determine whether to activate an aggressive throttle flag. The method further includes analyzing the lateral acceleration values for the plurality of points in time to determine whether to activate an aggressive lateral acceleration flag. In addition, the method includes activating a fluid consumption detection enable flag when the aggressive throttle flag and the aggressive lateral acceleration flag are both active.

In yet another aspect, a vehicle controller is provided. The vehicle controller includes at least one processor in communication with at least one memory. The at least one processor is programmed to receive, at a plurality of points in time, a current throttle value and a current lateral acceleration value. For each of the plurality of points in time, the at least one processor is programmed to compare the current throttle value to a throttle threshold. The at least one processor is also programmed to adjust a throttle counter based on the comparison. The at least one processor is further programmed to compare the throttle counter to a first threshold. In addition, the at least one processor is programmed to activate an aggressive throttle flag when the throttle counter exceeds the first threshold. For each of the plurality of points in time, the at least one processor is programmed to compare the current lateral acceleration value to a lateral acceleration threshold. Moreover, the at least one processor is programmed to adjust a lateral acceleration counter based on the comparison. Furthermore, the at least one processor is programmed to compare the lateral acceleration counter to a second threshold. The at least one processor is also programmed to activate an aggressive lateral acceleration flag when the lateral acceleration counter exceeds the second threshold. The at least one processor is further programmed to activate a fluid consumption detection enable flag when the aggressive throttle flag and the aggressive lateral acceleration flag are both active.

DETAILED DESCRIPTION

The systems and methods described herein relate generally to vehicle control systems and, more specifically, to vehicle control systems for monitoring aggressive driving behavior and providing an improved fluid consumption detection (FCD) indicator.

Figure 1:
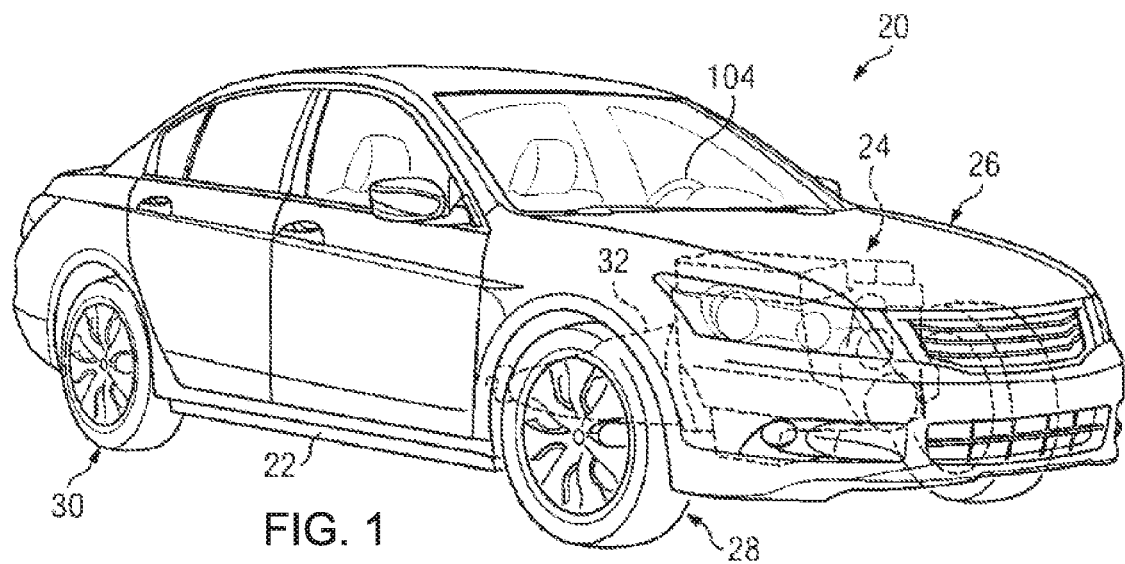
FIG. 1 is a right front perspective view of an exemplary vehicle.

FIG. 1 is a right front perspective view of an exemplary vehicle 20. In the exemplary embodiment, vehicle 20 is an automobile. In other embodiments, vehicle 20 may be any of a variety of other suitable vehicles, such as a recreational vehicle or a utility vehicle, for example. In the exemplary embodiment, vehicle 20 includes a frame 22 and an engine 24. Engine 24 is mounted within an engine compartment 26. Front wheels (e.g., 28) and rear wheels (e.g., 30) are rotatably coupled with frame 22. Vehicle 20 includes a transmission 32 that couples engine 24 with one or more of the wheels (e.g., 28, 30) of vehicle 20. Transmission 32 is coupled to engine 24 such that power from engine 24 is transmitted through transmission 32, to a drivetrain (not shown), and to the wheels (e.g., 28, 30) to propel vehicle 20. The transmission 32 can be operable in any of a plurality of gears (not shown) to facilitate operation of vehicle 20 at different speeds.

Vehicle 20 includes an accelerator pedal 230 (shown in FIG. 2) that is selectively movable (e.g., with an operator's foot) to facilitate operation of vehicle 20 at different speeds. In other embodiments, vehicle 20 can include a hand-operated throttle or any of a variety of other suitable throttle devices that are movable to facilitate selective acceleration of vehicle 20. Vehicle 20 also includes a brake pedal 235 (shown in FIG. 2) that is selectively movable (e.g., with an operator's foot) to facilitate operation of vehicle 20 at different speeds. In such an embodiment, a brake switch can be associated with brake pedal 235 and selectively actuated by the brake pedal to operate brake lights on vehicle 20. Vehicle 20 further includes a steering wheel 104 that facilitates steering of vehicle 20

Figure 2:
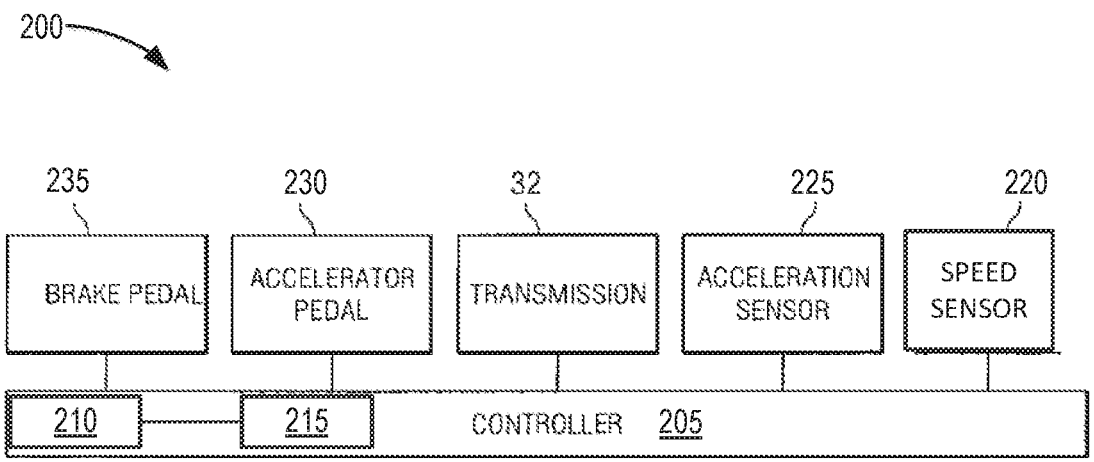
FIG. 2 is a block diagram of an exemplary vehicle control system including a controller and certain other components of the vehicle of FIG. 1.

FIG. 2 is a block diagram of an exemplary vehicle control system 200 including a controller 205 that may be used to detect aggressive driving behavior and provide an improved FCD indicator.

Controller 205 may be any suitable controller that enables vehicle 20 to function as described herein, including any suitable analog controller, digital controller, or combination of analog and digital controllers. In some embodiments, controller 205 includes an engine control unit (ECU), a power train control module (PCM), an engine control module (ECM) or any of a variety of other suitable alternative vehicular controllers. In some embodiments, controller 205 includes a processor 210 that executes computer-executable instructions loaded or stored in a memory device 215 communicatively coupled to processor 210. Controller 205 may generally include any suitable computer and/or other processing unit, including any suitable combination of computers, processing units and/or the like that may be operated independently, or in combination with one another. Thus, in several embodiments, controller 205 may include one or more processor(s) and associated memory device(s) configured to perform a variety of computer-implemented functions including, but not limited to, the functions disclosed herein, such as receiving, at a plurality of points in time, a current throttle value and a current lateral acceleration value, for each of the plurality of points in time, comparing the current throttle value to a throttle threshold, adjusting a throttle counter based on the comparison, comparing the throttle counter to a first threshold, activating an aggressive throttle flag when the throttle counter exceeds the first threshold, for each of the plurality of points in time, comparing the current lateral acceleration value to a lateral acceleration threshold, adjusting a lateral acceleration counter based on the comparison, comparing the lateral acceleration counter to a second threshold, activating an aggressive lateral acceleration flag when the lateral acceleration counter exceeds the second threshold, and activating a fluid consumption detection enable flag when the aggressive throttle flag and the aggressive lateral acceleration flag are both active.

As illustrated in FIG. 2, controller 205 is coupled with a speed sensor 220 and an acceleration sensor 225 to facilitate detection of the speed and acceleration of vehicle 20, respectively. In some embodiments, speed sensor 220 may include a speedometer sensor, wheel speed sensor(s) located on one or more of the wheels (e.g., as part of an antilock brake system), and/or any of a variety of other suitable speed sensor arrangements such as, for example, sensors associated with a transmission, a transfer assembly, or an engine, which can indirectly obtain speed data. In one embodiment, acceleration sensor 225 includes an accelerometer that detects longitudinal, vertical, and/or horizontal acceleration/deceleration of vehicle 20. In other embodiments, an acceleration sensor can include any of a variety of arrangements that facilitate detection of vehicular longitudinal, vertical, and/or horizontal acceleration/deceleration. In still other embodiments, speed sensor 220 and acceleration sensor 225 can be provided as outputs from a global positioning system (GPS). Controller 205 is coupled with transmission 32, accelerator pedal 230, and brake pedal 235 to detect an operating gear of transmission 32 and to detect command signals from accelerator pedal 230 and brake pedal 235. Controller 205 is coupled with a brake pedal 235, as illustrated in FIG. 2. In one embodiment, controller 205 detects operation of brake pedal 235 according to a brake switch. In such an embodiment, the brake switch can be associated with brake pedal 235 and selectively actuated by the brake pedal to operate brake lights on vehicle 20.

Figure 3:
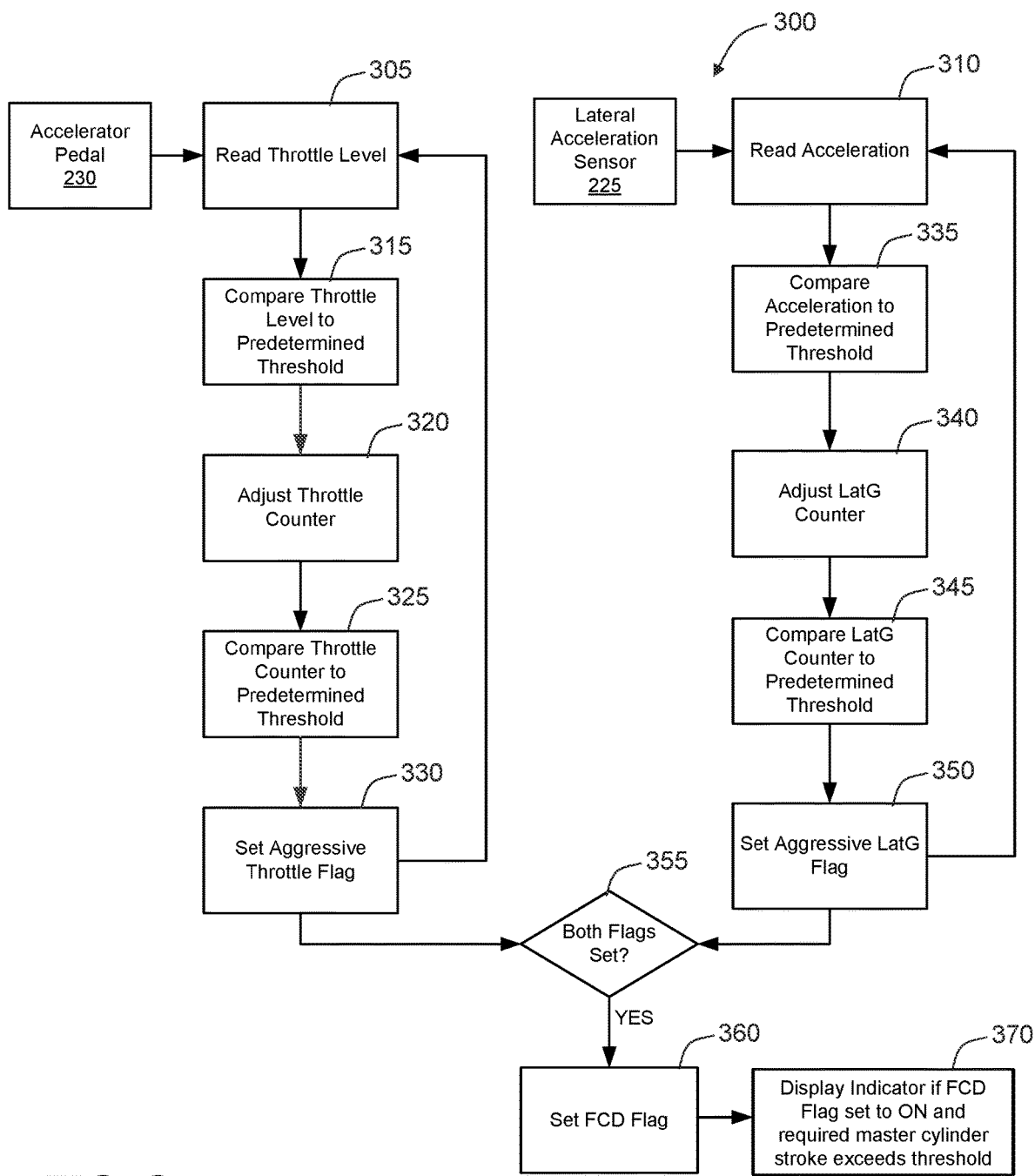
FIG. 3 illustrates a process for providing a fluid consumption detection (FCD) indicator in the vehicle shown in FIG. 1.

FIG. 3 illustrates a process 300 for providing a fluid consumption detection (FCD) indicator in a vehicle 20 (shown in FIG. 1). In the exemplary embodiment, process 300 is performed by controller 205 (shown in FIG. 2). In the exemplary embodiment, process 300 is performed in real-time as the vehicle 20 is being operated.

The process 300 is directed towards detecting aggressive driving for a warning indicator related to an electric servo brake (ESB) system. Some ESB systems include a brake fluid consumption detection system that can detect brake fluid consumption changes. For example, the brake fluid consumption detection system may analyze brake fluid consumption by comparing a master cylinder stroke verses a master cylinder pressure to a modeled known condition. For example, the controller 205 may detect abnormal brake fluid consumption based on a comparison of at least one of a master cylinder stroke and a master cylinder pressure to predefined threshold value(s). If the required master cylinder stroke to reach a set pressure becomes too high (i.e., exceeds a predefined threshold), braking performance can be reduced and a warning indicator is displayed to the driver (i.e., the Fluid Consumption Detection (FCD) warning). However, the accuracy of the fluid consumption determination made by fluid consumption detection systems may be negatively affected by aggressive driving. For example, a single application of heavy throttle, in combination with a brake system nearing a condition that would warrant activation of the FCD warning, may result in activation of the FCD warning. When driving normally (i.e., not consistently aggressively), an FCD warning is not critical and, in this situation, may be considered to be a false and/or unnecessary warning. However, when consistently driving aggressively, an FCD warning may be critical.

In order to prevent false and/or unnecessary FCD warnings to the driver, process 300 detects aggressive driving over a period of time, allowing the driver to be notified only in situations where the driver needs to change their driving behavior and/or perform service to the vehicle to correct a potential brake system concern. In process 300, the driver is determined to be driving aggressively if both an "aggressive throttle flag" and "aggressive LatG flag" are on. If neither the "aggressive throttle flag" nor the "aggressive LatG flag" are on, the FCD warning will not be displayed even if the required master cylinder stroke becomes higher than the stored threshold. If only one of the "aggressive throttle flag" and the "aggressive LatG flag" are on, the result is the same (i.e., the FCD warning will not be displayed even if the required master cylinder stroke becomes too high). If both the "aggressive throttle flag" and the "aggressive LatG flag" are on, the driver is determined to be driving aggressively, and the FCD warning light will be lit if the required master cylinder stroke becomes too high. As referred to herein, a "flag" is a value stored within, for example, controller 205, which acts as a signal used in the determination of whether to display the FCD warning. The flag may be activated or set to an ON state. The flag may also be deactivated or set to an OFF state.

In process 300, the controller 205 continuously reads 305 the current throttle level. In the exemplary embodiment, the controller 205 reads 305 the throttle level based on sensor readings from the accelerator pedal 230. In the exemplary embodiment, the sensor readings represent the percentage that the accelerator pedal 230 is depressed as a percentage of the maximum. In other embodiments, the controller 205 may use other sensors for reading the throttle. In some embodiments, the controller 205 reads 305 the current throttle level on a periodic basis.

In process 300, the controller 205 also continuously reads 310 the current lateral acceleration of the vehicle 20. In the exemplary embodiment, the controller 205 receives sensor information from one of more sensors, such as, but not limited to the lateral acceleration sensor 225. In the exemplary embodiment, the sensor readings represent the current G forces affecting the vehicle 20. In some embodiments, the controller 205 reads 310 the current lateral acceleration on a periodic basis.

In the exemplary embodiment, the controller 205 compares 315 the current throttle level to a predetermined throttle threshold to determine if the current throttle level exceeds the predetermined throttle threshold. In the exemplary embodiment, the controller 205 compares 315 the current throttle level to the predetermined throttle threshold on a periodic basis, such as, but not limited to, every second or millisecond. Other periods of time may be used, and the period of may be adjusted based on user or design preferences.

Based on the results of the comparison, the controller 205 adjusts 320 a throttle counter. If the current throttle level exceeds the predetermined throttle threshold, the controller 205 increases 320 the throttle counter. If the current throttle level does not exceed the predetermined throttle threshold, the controller 205 decreases 320 the throttle counter. In some embodiments, the controller 205 may increase the throttle counter by a different amount than the throttle counter is decreased. For example, the throttle counter may be increased by X amount every period of where the threshold is exceeded, while only decreased by X/100 amount every period of time where the threshold is not exceeded. These numbers may be adjusted for user or designer preferences. In the exemplary embodiment, the throttle counter has a range of values from a minimum value to a maximum value. If the throttle counter is already at the maximum value and the threshold is exceeded, then no adjustment is made. If the throttle counter is already at the minimum value and the threshold is not exceeded, then no adjustment is made.

The controller 205 compares 325 the throttle counter to a predetermined aggressive throttle threshold to determine if the throttle counter exceeds the predetermined aggressive throttle threshold. If the predetermined aggressive throttle threshold is exceeded, then the controller 205 sets 330 the aggressive throttle flag to ON (or activated). If the predetermined aggressive throttle threshold is not exceeded, then the controller 205 sets 330 the aggressive throttle flag to OFF (or deactivated).

While steps 315-330 are being performed, steps 335-350 are simultaneously being performed by the controller 205.

In the exemplary embodiment, the controller 205 compares 335 the current lateral acceleration to a predetermined lateral acceleration (LatG) threshold to determine if the current lateral acceleration exceeds the predetermined LatG threshold. In the exemplary embodiment, the controller 205 compares 335 the current lateral acceleration to the predetermined LatG threshold on a periodic basis, such as, but not limited to, every second or millisecond. Other periods of time may be used, and the period of may be adjusted based on user or design preferences.

Based on the results of the comparison, the controller 205 adjusts 340 a LatG counter. If the current lateral acceleration exceeds the predetermined LatG threshold, the controller 205 increases 340 the LatG counter. If the current LatG level does not exceed the predetermined throttle threshold, the controller 205 decreases 340 the LatG counter. In some embodiments, the controller 205 may increase the LatG counter by a different amount than the LatG counter is decreased. For example, the LatG counter may be increased by Y amount every period of where the threshold is exceeded, while only decreased by Y/50 amount every period of time where the threshold is not exceeded. These numbers may be adjusted for user or design preferences. In the exemplary embodiment, the LatG counter has a range of values from a minimum value to a maximum value. If the LatG counter is already at the maximum value and the threshold is exceeded, then no adjustment is made. If the LatG counter is already at the minimum value and the threshold is not exceeded, then no adjustment is made.

The controller 205 compares 345 the LatG counter to a predetermined aggressive LatG threshold to determine if the LatG counter exceeds the predetermined aggressive LatG threshold. If the predetermined aggressive LatG threshold is exceeded, then the controller 205 sets 350 the aggressive LatG flag to ON (or activated). If the predetermined aggressive LatG threshold is not exceeded, then the controller 205 sets 350 the aggressive LatG flag to OFF (or deactivated).

In the exemplary embodiment, the controller 205 determines 355 if both the aggressive throttle flag and the aggressive LatG flag are both set to ON (or both activated). If both flags are set to ON, the controller 205 sets the Fluid Consumption Detection (FCD) enable flag to ON (or activated). If both are not set to ON, the controller 205 sets 360 the FCD enable flag to OFF (or deactivated). In some embodiments, an FCD warning indicator is only displayed to the driver when the FCD enable flag is set 360 to ON. The FCD warning indicator is displayed 370 when the FCD enable flag is set to ON and abnormal brake fluid consumption is detected. As described above, the controller 205 may detect abnormal brake fluid consumption based on a comparison of at least one of a master cylinder stroke and a master cylinder pressure to predefined threshold value(s). In one specific example, if the required master cylinder stroke exceeds the predefined stroke threshold, but the FCD enable flag is set to OFF, the FCD warning indicator is not displayed. In some embodiments, the FCD warning indicator is a light, an icon, a text message displayed on an instrument panel and/or display device of the vehicle 20, and/or any other type of indicator that informs the driver of an abnormal brake fluid consumption condition.

For example, while a driver is operating the vehicle 20, the controller 205 is reading 305 and 310 both the current throttle level and the current lateral acceleration. When the current throttle level exceeds a first throttle level predefined as corresponding to operating the throttle aggressively, the controller 205 increases the throttle counter by a first amount. In an exemplary embodiment, the first throttle level is approximately 75% to 90%, wherein 100% corresponds to a fully open throttle (i.e., max throttle). When the current throttle level does not exceed the first throttle level, the controller 205 decreases the throttle counter by a second amount. The first amount and the second amount in which the throttle counter is increased and decreased, respectively, may be the same amount, or may be different amounts. Different amounts may be chosen to weigh how rapidly the throttle counter is increased and/or decreased. When the throttle counter exceeds a value corresponding to the aggressive throttle threshold, the controller 205 sets the aggressive throttle flag to ON. When the throttle counter does not exceed the aggressive throttle threshold, the controller 205 sets the aggressive throttle flag to OFF.

When the current lateral acceleration exceeds a first lateral acceleration value predefined as corresponding to operating the vehicle in a manner resulting in aggressive lateral acceleration, the controller 205 increases the LatG counter by a first amount. In an exemplary embodiment, the first lateral acceleration value is approximately 0.6 G to 0.8 G. When the current lateral acceleration does not exceed the first lateral acceleration value, the controller 205 decreases the LatG counter by a second amount. As described above with respect to the throttle counter, the first amount and the second amount in which the LatG counter is increased and decreased, respectively, may be the same amount, or may be different amounts. When the LatG counter exceeds a value corresponding to the aggressive lateral acceleration threshold, the controller 205 sets the aggressive LatG flag to ON. When the LatG counter does not exceed the aggressive lateral acceleration threshold, the controller 205 sets the aggressive LatG flag to OFF. If at any point both the aggressive throttle flag and the aggressive LatG flag are both set to ON, the controller 205 sets 360 the FCD enable flag to ON.

In some embodiments, the predetermined thresholds are adjustable based on user and/or design considerations.

In the exemplary embodiment, the thresholds, the throttle counter, the LatG counter, and the flags are all stored in the memory device 215 (shown in FIG. 2).

Figure 4:
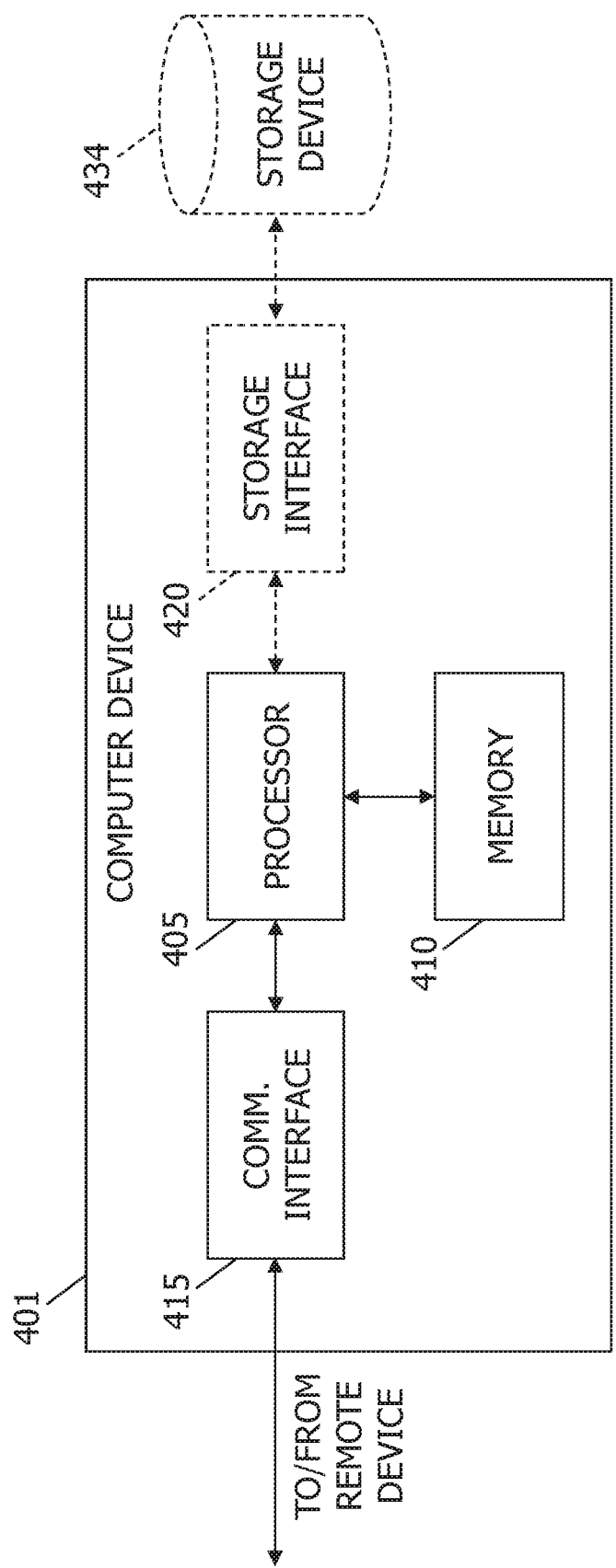
FIG. 4 illustrates an exemplary configuration of a computer system shown in FIG. 2, in accordance with one embodiment of the present disclosure.

FIG. 4 illustrates an exemplary configuration of a computer system shown in FIG. 2, in accordance with one embodiment of the present disclosure. Computer device 401 may include, but is not limited to, vehicle control system controller 205 (shown in FIG. 2). Computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that computer device 401 is capable of communicating with a remote device such as another computer device 401, acceleration sensor 225, speed sensor 220, accelerator pedal 230, brake pedal 235, transmission 32 (all shown in FIG. 2), a diagnostic computer (not shown), and a user computer device (not shown).

Processor 405 may also be operatively coupled to a storage device 434. Storage device 434 is any computer-operated hardware suitable for storing and/or retrieving data, such as, but not limited to, data associated with database. In some embodiments, storage device 434 is integrated in computer device 401. For example, computer device 401 may include one or more hard disk drives as storage device 434. In other embodiments, storage device 434 is external to computer device 401 and may be accessed by a plurality of computer devices 401. For example, device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 3.

As used herein, the term "processor" refers not only to integrated circuits, but also refers to a microcontroller, a microcomputer, a programmable logic controller (PLC), an application specific integrated circuit, and other programmable circuits. Additionally, the memory device(s) of controller 205 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, the functions described herein.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The methods and system described herein may be implemented using computer programming or engineering techniques including computer software, firmware, hardware, or any combination or subset. As described above, at least one technical problem with known systems is a need to properly detect aggressive driving to determine when to display fluid consumption detection warnings. The system and methods described herein address that technical problem. The technical effect of the systems and processes described herein is achieved by performing at least one of the following steps: (a) receive sensor information from a plurality of sensors associated with the vehicle, where the sensor information includes throttle values and lateral acceleration values; (b) analyze the throttle values for a plurality of points in time to determine whether to activate an aggressive throttle flag; (c) analyze the lateral acceleration values for the plurality of points in time to determine whether to activate an aggressive lateral acceleration flag; (d) activate a fluid consumption detection enable flag when the aggressive throttle flag and the aggressive lateral acceleration flag are both active; (e) for each of the plurality of points in time, compare the throttle value to a throttle threshold; (f) adjust a throttle counter based on the comparison; (g) increase the throttle counter by a first amount when the throttle value exceeds the throttle threshold; (h) decrease the throttle counter by a second amount when the throttle value does not exceed the throttle threshold, where the first amount and the second amount are different; (i) compare the throttle counter to a first threshold; (j) activate the aggressive throttle flag when the throttle counter exceeds the first threshold; (k) deactivate the aggressive throttle flag when the throttle counter does not exceed the first threshold; (l) for each of the plurality of points in time, compare the lateral acceleration value to a lateral acceleration threshold; (m) adjust a lateral acceleration counter based on the comparison; (n) increase the lateral acceleration counter by a first amount when the lateral acceleration value exceeds the lateral acceleration threshold; (o) decrease the lateral acceleration counter by a second amount when the lateral acceleration value does not exceed the lateral acceleration threshold, where the first amount and the second amount are different; (p) compare the lateral acceleration counter to a first threshold; (q) activate the aggressive lateral acceleration flag when the lateral acceleration counter exceeds the first threshold; (r) deactivate the aggressive lateral acceleration flag when the lateral acceleration counter does not exceed the first threshold; (s) display a warning indicator to a driver of the vehicle when a fluid consumption detection enable flag is active and an abnormal brake fluid consumption is detected; (t) deactivate the fluid consumption detection enable flag when at least one of the aggressive throttle flag and the aggressive lateral acceleration flag are deactivated; (u) detect abnormal brake fluid consumption; (v) activate a fluid consumption detection indicator when abnormal brake fluid consumption is detected and the fluid consumption detection enable flag is activated; and (w) not activate the fluid consumption detection indicator unless the fluid consumption detection enable flag is activated. The resulting technical effect is that the vehicle is able to dynamically determine whether or not the driver is engaging in aggressive driving and provide improved fluid consumption detection indicators.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for providing vehicle condition indicators, the system comprising a controller including at least one processor in communication with at least one memory, the at least one processor programmed to:
   receive sensor information from a plurality of sensors associated with a vehicle, wherein the sensor information includes throttle values and lateral acceleration values;
   analyze the throttle values for a plurality of points in time to determine whether to activate an aggressive throttle flag;
   analyze the lateral acceleration values for the plurality of points in time to determine whether to activate an aggressive lateral acceleration flag;
   activate a fluid consumption detection enable flag when the aggressive throttle flag and the aggressive lateral acceleration flag are both active;
   determine a master cylinder stroke required to reach a set pressure;
   compare a master cylinder stroke required to reach a set pressure to a predetermined threshold; and
   activate a fluid consumption detection warning based on the comparison and the fluid consumption detection enable flag.

2. The system in accordance with claim 1, wherein the at least one processor is further programmed to:
   for each of the plurality of points in time, compare the throttle value to a throttle threshold; and
   adjust a throttle counter based on the comparison.

3. The system in accordance with claim 2, wherein the at least one processor is further programmed to:
   increase the throttle counter by a first amount when the throttle value exceeds the throttle threshold; and
   decrease the throttle counter by a second amount when the throttle value does not exceed the throttle threshold, wherein the first amount and the second amount are different.

4. The system in accordance with claim 2, wherein the at least one processor is further programmed to:
   compare the throttle counter to a first threshold;
   activate the aggressive throttle flag when the throttle counter exceeds the first threshold; and
   deactivate the aggressive throttle flag when the throttle counter does not exceed the first threshold.

5. The system in accordance with claim 1, wherein the at least one processor is further programmed to:
   for each of the plurality of points in time, compare the lateral acceleration value to a lateral acceleration threshold; and
   adjust a lateral acceleration counter based on the comparison.

6. The system in accordance with claim 5, wherein the at least one processor is further programmed to:
   increase the lateral acceleration counter by a first amount when the lateral acceleration value exceeds the lateral acceleration threshold; and
   decrease the lateral acceleration counter by a second amount when the lateral acceleration value does not exceed the lateral acceleration threshold, wherein the first amount and the second amount are different.

7. The system in accordance with claim 5, wherein the at least one processor is further programmed to:
   compare the lateral acceleration counter to a first threshold;
   activate the aggressive lateral acceleration flag when the lateral acceleration counter exceeds the first threshold; and
   deactivate the aggressive lateral acceleration flag when the lateral acceleration counter does not exceed the first threshold.

8. The system in accordance with claim 1, wherein the at least one processor is further programmed to detect abnormal brake fluid consumption.

9. The system in accordance with claim 8, wherein the at least one processor is further programmed to activate a fluid consumption detection indicator when abnormal brake fluid consumption is detected and the fluid consumption detection enable flag is activated.

10. The system in accordance with claim 9, wherein the at least one processor is programmed to not activate the fluid consumption detection indicator unless the fluid consumption detection enable flag is activated.

11. The system in accordance with claim 1, wherein the at least one processor is further programmed to instruct at least one of a display device and an instrument panel of the vehicle to display a warning indicator to a driver of the vehicle when fluid consumption detection enable flag is active.

12. The system in accordance with claim 11, wherein the warning indicator includes at least one of a light, an icon, and a text message.

13. The system in accordance with claim 1, wherein the at least one processor is further programmed to deactivate the fluid consumption detection enable flag when at least one of the aggressive throttle flag and the aggressive lateral acceleration flag are deactivated.

14. The system in accordance with claim 1, further comprising an acceleration pedal sensor for detecting throttle values and at least one acceleration sensor for detecting lateral acceleration values.

15. A method for providing vehicle condition indicators, the method implemented by a vehicle controller comprising at least one processor in communication with at least one memory, the method comprises:
- receiving sensor information from a plurality of sensors associated with a vehicle, wherein the sensor information includes throttle values and lateral acceleration values;
- analyzing the throttle values for a plurality of points in time to determine whether to activate an aggressive throttle flag;
- analyzing the lateral acceleration values for the plurality of points in time to determine whether to activate an aggressive lateral acceleration flag;
- activating a fluid consumption detection enable flag when the aggressive throttle flag and the aggressive lateral acceleration flag are both active;
- determining a master cylinder stroke required to reach a set pressure;
- comparing a master cylinder stroke required to reach a set pressure to a predetermined threshold; and
- activating a fluid consumption detection warning based on the comparison and the fluid consumption detection enable flag.

16. The method in accordance with claim 15 further comprising detecting abnormal brake fluid consumption.

17. The method in accordance with claim 16 further comprising activating a fluid consumption detection indicator when abnormal brake fluid consumption is detected and the fluid consumption detection enable flag is activated.

18. The method in accordance with claim 17 further comprising not activating the fluid consumption detection indicator unless the fluid consumption detection enable flag is activated.

19. The method in accordance with claim 15 further comprising deactivating the fluid consumption detection enable flag when at least one of the aggressive throttle flag and the aggressive lateral acceleration flag are deactivated.

20. A vehicle controller including at least one processor in communication with at least one memory, the at least one processor programmed to:
- receive, at a plurality of points in time, a current throttle value and a current lateral acceleration value;
- for each of the plurality of points in time, compare the current throttle value to a throttle threshold;
- adjust a throttle counter based on the comparison;
- compare the throttle counter to a first threshold;
- activate an aggressive throttle flag when the throttle counter exceeds the first threshold;
- for each of the plurality of points in time, compare the current lateral acceleration value to a lateral acceleration threshold;
- adjust a lateral acceleration counter based on the comparison;
- compare the lateral acceleration counter to a second threshold;
- activate an aggressive lateral acceleration flag when the lateral acceleration counter exceeds the second threshold;
- activate a fluid consumption detection enable flag when the aggressive throttle flag and the aggressive lateral acceleration flag are both active;
- determine a master cylinder stroke required to reach a set pressure;
- compare a master cylinder stroke required to reach a set pressure to a predetermined threshold; and
- activate a fluid consumption detection warning based on the comparison and the fluid consumption detection enable flag.

* * * * *